(12) United States Patent
Yin et al.

(10) Patent No.: US 10,922,042 B2
(45) Date of Patent: Feb. 16, 2021

(54) SYSTEM FOR SHARING VIRTUAL CONTENT AND METHOD FOR DISPLAYING VIRTUAL CONTENT

(71) Applicant: Guangdong Virtual Reality Technology Co., Ltd., Guangzhou (CN)

(72) Inventors: Yuanqing Yin, Guangzhou (CN); Jingwen Dai, Guangzhou (CN); Jie He, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 16/432,906

(22) Filed: Jun. 5, 2019

(65) Prior Publication Data

US 2019/0294403 A1 Sep. 26, 2019

(30) Foreign Application Priority Data

Jun. 5, 2018 (CN) .......................... 201810569821.5

(51) Int. Cl.
*G06F 3/14* (2006.01)
*G06T 7/73* (2017.01)
*A63F 13/52* (2014.01)
*A63F 13/65* (2014.01)

(52) U.S. Cl.
CPC ............ *G06F 3/1454* (2013.01); *A63F 13/52* (2014.09); *A63F 13/65* (2014.09); *G06T 7/73* (2017.01); *A63F 2300/30* (2013.01); *A63F 2300/69* (2013.01); *G06T 2207/30204* (2013.01)

(58) Field of Classification Search
CPC ........ G06F 3/1454; A63F 13/52; A63F 13/65; A63F 2300/30; A63F 2300/69; G06T 7/73; G06T 2207/30204
See application file for complete search history.

(56) References Cited

U.S. PATENT DOCUMENTS

| | | | |
|---|---|---|---|
| 2006/0152434 A1* | 7/2006 | Sauer ................ | G02B 27/0101 345/8 |
| 2011/0216002 A1* | 9/2011 | Weising .................. | A63F 3/02 345/158 |
| 2014/0016750 A1* | 1/2014 | Kang ..................... | A61B 6/589 378/62 |
| 2018/0165670 A1* | 6/2018 | Bacallao ............. | G07G 1/0036 |

(Continued)

*Primary Examiner* — Grace Q Li (57) ABSTRACT

A method for displaying virtual content and a system for sharing virtual content are disclosed. The method includes obtaining, by a first electronic device, a first spatial location information of the first electronic device with respect to at least one marker; receiving, by the first electronic device, data of a first virtual object generated in a second electronic device and a second spatial location information of the first virtual object with respect to the at least one marker; generating, by the first electronic device, a second virtual object based on the data of the first virtual object, the first spatial location information, and the second spatial location information, to obtain a display content, wherein the second virtual object is same to the first virtual object in content while the second virtual object is different from the first virtual object with a different display angle; and displaying the display content.

20 Claims, 5 Drawing Sheets

(56) References Cited

U.S. PATENT DOCUMENTS

2019/0147619 A1* 5/2019 Goldman ................. G06T 7/75
  382/154
2020/0050256 A1* 2/2020 Yamamoto ............. G06F 3/013
2020/0193622 A1* 6/2020 Stopp ........................ G06T 7/70

* cited by examiner

SYSTEM FOR SHARING VIRTUAL CONTENT AND METHOD FOR DISPLAYING VIRTUAL CONTENT

CROSS-REFERENCE TO RELATED APPLICATIONS

This application claims priority to Chinese Patent Application No. 201810569821.5, filed on Jun. 5, 2018, the content of which is herein incorporated by reference in its entirety.

TECHNICAL FIELD

The present disclosure generally relates to a system for sharing virtual content and a method for displaying virtual content.

BACKGROUND

In recent years, with the advancement of technology, technologies such as Augmented Reality (AR) and Virtual Reality (VR) have gradually become hotspots. Taking augmented reality as an example, augmented reality is a technology that increases user perception of the real world through information provided by a computer system. It overlays computer-generated virtual objects, scenes, or system prompt information into real world to enhance or modify the perception of the real world environment or the perception of data representing the real world environment.

SUMMARY OF THE DISCLOSURE

According to one aspect of the present disclosure, a method for displaying virtual content is provided. The method includes obtaining, by a first electronic device, a first spatial location information of the first electronic device with respect to at least one marker; receiving, by the first electronic device, data of a first virtual object generated in a second electronic device and a second spatial location information of the first virtual object device with respect to the marker; generating, by the first electronic device, a second virtual object based on the data of the first virtual object, the first spatial location information, and the second spatial location information, to obtain a display content, wherein the second virtual object is same to the first virtual object in content while the second virtual object is different from the first virtual object with a different display angle; and displaying, by the first electronic device, the display content.

According to another aspect of the present disclosure, a method for displaying virtual content is provided. The method includes generating, by a second electronic device, data of a first virtual object and displaying the first virtual object; obtaining, by a second electronic device, a second spatial location information of the first virtual object with respect to at least one marker; and transmitting, by the second electronic device, the data of the first virtual object and the second spatial location information of the second electronic device with respect to the at least one marker to a first electronic device, wherein a second virtual object is generated in the first electronic device based on the data of the first virtual object, a first spatial location information of the first electronic device with respect to the at least one marker, and the second spatial location information, to obtain a display content, the second virtual object is same to the first virtual object in content while the second virtual object is different from the first virtual object with a different display angle, and the display content is displayed on the first electronic device.

According to yet another aspect of the present disclosure, a system for sharing virtual content is provided. The system includes a first electronic device, a second electronic device, and at least one marker; wherein the first electronic device comprises a processor and a non-transitory memory having instructions stored thereon, which when executed by the processor, cause the processor to perform a method in the above aspect.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

The technical solutions in the embodiments of the present disclosure are described in conjunction with the drawings in the embodiments of the present disclosure. It is obvious that the described embodiments are only a part of the embodiments of the present disclosure, and not all embodiments. All other embodiments obtained by the ordinary skilled in the art based on the embodiments in the present disclosure without the creative work are all within the scope of the present disclosure.

It should be noted that similar reference numerals and letters indicate similar items in the following figures. Therefore, once an item is defined in a drawing, it is not necessary to further define and explain it in the subsequent drawings. Also, in the description of the present disclosure, the terms "first", "second", and the like are used merely to distinguish a description, and are not to be construed as indicating or implying a relative importance.

In order to understand the present disclosure, a system for sharing virtual content will be described firstly in accordance with FIGS. 1-3.

Figure 1:
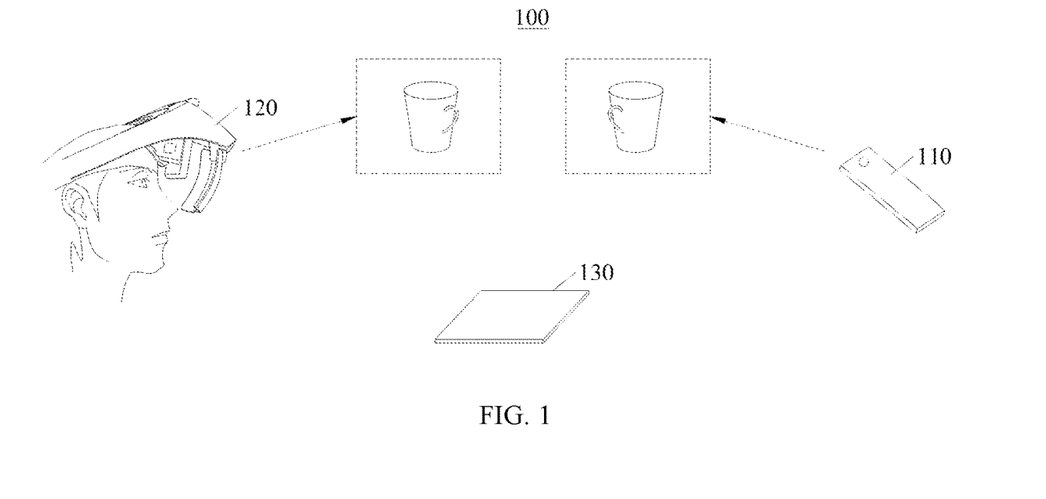
FIG. 1 is a schematic structural view of a system for sharing virtual content according to an embodiment of the present disclosure.
Figure 2:
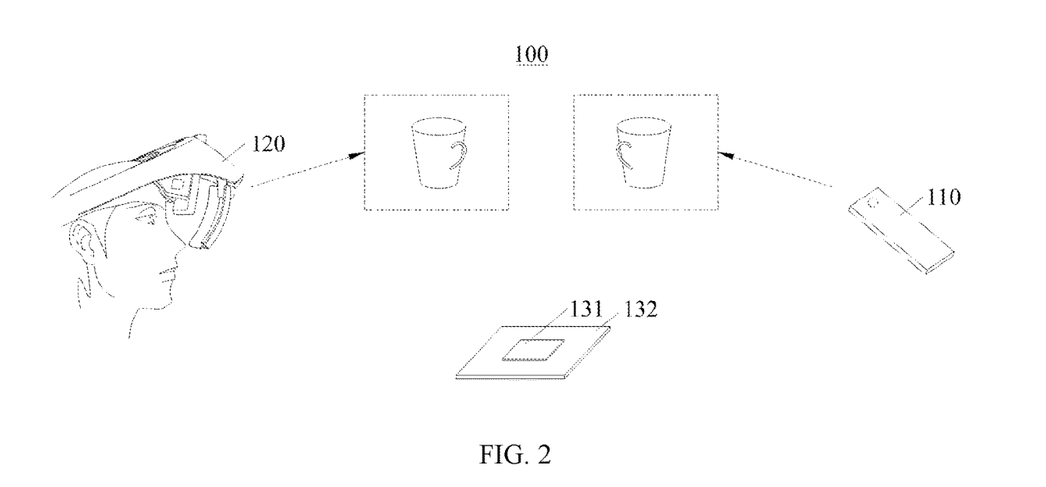
FIG. 2 is a schematic structural view of a system for sharing virtual content according to an embodiment of the present disclosure.
Figure 3:
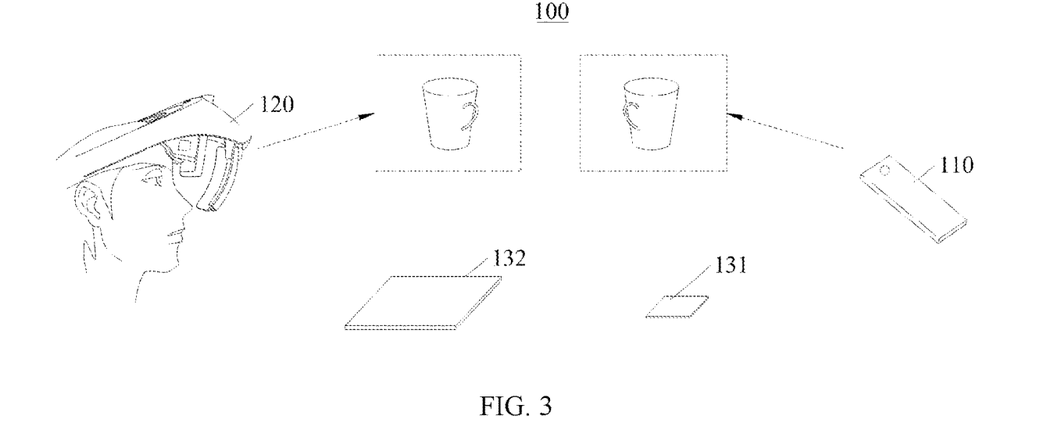
FIG. 3 is a schematic structural view of a system for sharing virtual content according to an embodiment of the present disclosure.

FIGS. 1-3 are a schematic structural diagram a system 100 for sharing content according to an embodiment of the present disclosure. The system 100 includes a first electronic device 110, a second electronic device 120, and at least one marker. The first electronic device 110 may be a mobile terminal, such as a mobile phone, a tablet computer, or the like. The second electronic device 300 may be an integrated head mounted display (HMD), or a separate head mounted display (HMD) connected with an electronic device outside. The head mounted displays may provide an immersive virtual reality experience or augmented reality experience.

In one embodiment, as shown in FIG. 1, at least one marker may be one marker 130. That is, there is one marker 130 in the system 100. The marker 130 is disposed in the fields of view of the first electronic device 110 and the second electronic device 120. The marker 130 may be configured to be identified and tracked by both the first electronic device 110 and the second electronic device 120. Both the first electronic device 110 and the second electronic device 120 may capture images containing the same marker 130, which are used for deriving a spatial location of the first electronic device 110 with respect to the marker 130 and a spatial location of the second electronic device 120 with respect to the marker 130.

In the system 100, a user of the second electronic device 120 can have an immersive virtual reality experience or augmented reality experience, and a user of the first electronic device 110 may know what virtual object the user of the second electronic device 120 are viewing and may know exactly where the virtual object is located from the perspective of the first electronic device 110. As shown in FIG. 1, the first electronic device 110 and the second electronic device 120 are in a same real scene. A first virtual object is displayed on the second electronic device 120, and with a method for displaying virtual content, which will be described in the following, a second virtual object is displayed on the first electronic device 110. The second virtual object is same to the first virtual object in content while the second virtual object is different from the first virtual object with a different display angle. Thus, the user of the second electronic device 120 may view a first virtual object in an angle where the second electronic device 120 is located, and the user of the first electronic device 110 may also view the same virtual object (i.e. second virtual object) in an angle where the first electronic device is located.

As shown in FIG. 1, in some embodiments, the marker 130 may be identified and tracked by both the first electronic device 110 and the second electronic device 120. In one embodiment, the marker 130 includes a pattern and an infrared element, the pattern is configured to be tracked and identified by the first electronic device 110, and the infrared element is configured to be tracked and identified by the second electronic device 120. Further, in one embodiment, the marker 130 includes a first section and a second section, the first section is configured to be identified and tracked by the first electronic device, and the second section is configured to be identified and tracked by the second electronic device, wherein the pattern is disposed in the first section and the infrared element is disposed in the second section.

In one embodiment, the first section and the second section have the same center. In one embodiment, the pattern is disposed on a surface of the infrared element, and an area of the pattern is less than an area of the surface of the infrared element.

The marker 130 in FIG. 1 includes one or more feature points. The shape of each feature point is not limited and may be a dot, a ring, or a triangle or other shapes. The outline of the marker 130 may a rectangle or other shapes, which is not limited herein.

It should be noted that it is not limited to the specific marker 130 in the present disclosure, there may be other markers in the system 100, and it is needed that the first electronic device 110 and the second device 120 can have the marker 131 to be tracked and identified.

In the above display system 100, when the marker 130 is within the fields of view of the first electronic device 110 and the second electronic device 120, the first electronic device 110 can acquire a target image containing the marker 130, and the second electronic device 120 can acquire a target image containing the marker 131. The target image containing the marker 130 can be obtained by the processor of the first electronic device 110 (for example, the processor 111 in FIG. 9), the marker 130 can then be identified, the relative location and orientation relationship between the marker 130 and the camera of the first electronic device 110 (for example, the camera 115 in FIG. 9) can then be derived. Thus, the relative location and orientation relationship for the first electronic device 110 with respect to the marker 130 can be obtained. Similarly, the target image containing the marker 130 can be obtained by the processor of the second electronic device 120 (for example, the processor 121 in FIG. 10), the marker 130 can then be identified, the relative location and orientation relationship between the marker 130 and the camera of the second electronic device 120 (for example, the image capturing device 124 in FIG. 9) can then be derived. Thus, the relative location and orientation relationship for the second electronic device 120 with respect to the marker 130 can be obtained.

In another embodiment, as shown in FIGS. 2 and 3, at least one marker may include a first marker 131 and the second marker 132. The first marker 131 is disposed in the field of view of the first electronic device 110 and may be configured to be identified and tracked by the first electronic device 110. The second marker 132 is disposed in the field of view of the second electronic device 120 and may be configured to be identified and tracked by the second electronic device 120. As shown in FIG. 2, the first marker 131 and the second marker 132 are disposed at the same location. In one embodiment, the first marker 131 is disposed on a surface of the second marker 132. The first marker 131 may be overlapped with the second marker 132 in the case the first marker 131 is disposed on a surface of the second marker 132. As shown in FIG. 3, the first marker 131 and the second marker 132 are disposed at the different locations. The first electronic device 110 and the second electronic device 120 may be in a same real scene in FIGS. 2 and 3. The first electronic device 110 and the second electronic device 120 may be in different real scenes in FIG. 3. The first electronic device 110 and the second electronic device 120 may capture images containing the first marker 131 and the second marker 132, respectively. The image containing the first marker 131 is used to derive a spatial location of the first electronic device 110 with respect to the first marker 131. The image containing the second marker 132 is used to derive a spatial location of the second electronic device 120 with respect to the second marker 132.

In the system 100, a user of the second electronic device 120 can have an immersive virtual reality experience or augmented reality experience, and a user of the first electronic device 110 may know what virtual object the user of the second electronic device 120 are viewing and may know exactly where the virtual object is located from the perspective of the first electronic device 110. As shown in FIG. 2, the first electronic device 110 and the second electronic device 120 are in a same real scene. A first virtual object is displayed on the second electronic device 120, and a method for displaying virtual content, which will be described in the following, a second virtual object is displayed on the first electronic device 110. The second virtual object is same to the first virtual object in content while the second virtual object is different from the first virtual object with a different display angle. As shown in FIG. 3, the first electronic device 110 and the second electronic device 120 are in a same real scene or different real scene. A first virtual object is displayed on the second electronic device 120, and with a method for displaying virtual content, which will be described in the following, a second virtual object is displayed on the first electronic device 110. The second virtual object is same to the first virtual object in content while the second virtual object is different from the first virtual object with a different display angle. Thus, the user of the second electronic device 120 may view a first virtual object in an angle where the second electronic device 120 is located, and the user of the first electronic device 110 may also view the same virtual object (i.e. second virtual object) in an angle where the first electronic device is located.

As shown in FIGS. 2 and 3, in some embodiments, the first marker 131 and the second marker 132 may also be distributed in a background according to a specific rule. The first marker 131 and the second marker 132 have different colors from that of the background. For example, both the first marker 131 and the second marker 132 have black color while the background has a white color.

In one embodiment of the present disclosure, the first marker 131 may be tracked and identified by the first electronic device 110 in a visible manner, and the second electronic device 120 may also be tracked and identified by the second electronic device 120 in a visible manner. The visible manner means that the first marker 131 is visible to the first electronic device 110, and the second marker 132 is visible to the second electronic device 120. For example, the first marker 131 may be a pattern that can be configured to be tracked and identified by the first electronic device 110, and the second marker 132 may be a pattern that can be configured to be tracked and identified by the second electronic device 120. In one embodiment, the first marker 131 may be tracked and identified by the first electronic device 110 in an infrared manner, and the second electronic device 120 may be tracked and identified by the second electronic device 120 in an infrared manner. The infrared manner means that the first marker 131 can be identified by the first electronic device 110 through infrared lights, and the second marker 132 can be identified by the second electronic device 120 through infrared lights. For example, the first marker 131 and the second marker 132 may be infrared elements, which can be tracked and identified by the first electronic device 110 and the second electronic device 120, respectively. The infrared elements may have a pattern therein, which may be tracked and identified by the second electronic device 120. In one embodiment, the first marker 131 may be tracked and identified by the first electronic device 110 in a visible manner, and the second electronic device 120 may be tracked and identified by the second electronic device 120 in an infrared manner. The visible manner means that the first marker 131 is visible to the first electronic device 110, and the infrared manner means that the second marker 132 can be identified by the second electronic device 120 through infrared lights. For example, the first marker 131 may be a pattern that can be configured to be tracked and identified by the first electronic device 110, and the second marker 132 may be an infrared element with another pattern therein. The infrared elements may include an infrared panel, an identifier-recognizable label, and an infrared filter.

Each of the first marker 131 and the second marker 132 in FIGS. 2-3 includes one or more feature points. The shape of each feature point is not limited and may be a dot, a ring, or a triangle or other shapes. The outline of the first marker 131 and the second marker 132 may a rectangle or other shapes, which is not limited herein.

It should be noted that it is not limited to the specific first marker 131 and the second marker 132 in the present disclosure, there may be other markers in the system 100, and it is needed that the first electronic device 110 can have the first marker 131 to be tracked and identified, and the second electronic device 120 can have the second marker 132 to be tracked and identified.

In the above display system 100, when the first marker 131 is within the field of view of the first electronic device 110, and the second marker 132 is within the field of view of the second electronic device 120, the first electronic device 110 can acquire a target image containing the first marker 131, and the second electronic device 120 can acquire a target image containing the second marker 132. The target image containing the first marker 131 can be obtained by the processor of the first electronic device 110 (for example, the processor 111 in FIG. 9), the first marker 131 can then be identified, the relative location and orientation relationship between the first marker 131 and the camera of the first electronic device 110 (for example, the camera 115 in FIG. 9) can then be derived. Thus, the relative location and orientation relationship for the first electronic device 110 with respect to the first marker 131 can be obtained. Similarly, the target image containing the second marker 132 and related information can be obtained by the processor of the second electronic device 120 (for example, the processor 121 in FIG. 10), the second marker 132 can then be identified, the relative location and orientation relationship between the second marker 132 and the camera of the second electronic device 120 (for example, the image capturing device 124 in FIG. 10) can then be derived. Thus, the relative location and orientation relationship for the second electronic device 120 with respect to the second marker 132 can be obtained.

In one embodiment of the present disclosure, when the second electronic device 120 is a head mounted display device for performing AR display, the head mounted display device can display the content of a virtual object, and a user of the head mounted display device can observe the content of the real scene through lens of the head mounted display device. The user can view the display content of the virtual object and the content of the real scene at the same time. Thus, the effect of augmented reality can be realized. When a user of the first electronic device 110 needs to know the content observed by the user of the second electronic device 120, or the user of the second electronic device 120 wants to share the observed content to the user of the first electronic device 110, the user of the second electronic device 120 needs to send the displayed virtual object to the first electronic device 110 for display.

However, if the virtual object displayed on the second electronic device 120 is directly displayed on the first electronic device 110, the user of the first electronic device 110 cannot know more clearly the location of the virtual object in the real scene, and cannot observe the virtual object from different perspectives.

Now a method for displaying virtual content according to an embodiment of the present disclosure will be described in the following with reference to the FIGS. 1-3.

Figure 4:
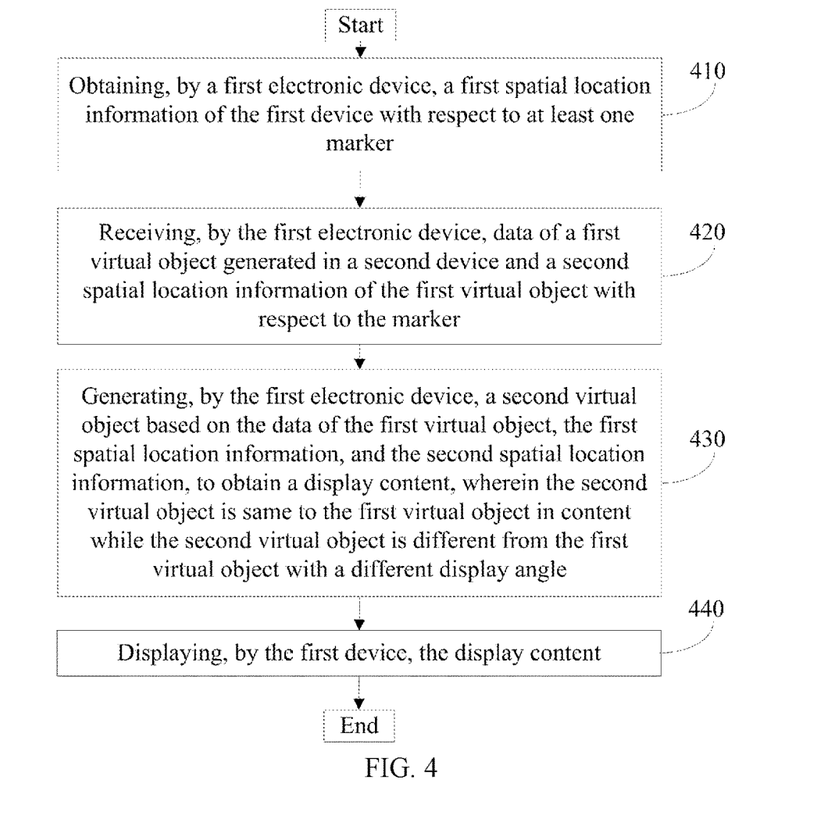
FIG. 4 is a flowchart of a method for displaying virtual content according to an embodiment of the present disclosure.

FIG. 4 is a flowchart of a method for displaying virtual content according to an embodiment of the present disclosure. The method is performed by the first electronic device 110 in above embodiments of FIGS. 1-3. As shown in FIG. 4, the method includes actions/operations in the following blocks.

At block 410, the first electronic device 110 obtains a first spatial location information of the first electronic device 110 with respect to at least one marker.

As mentioned above, in one embodiment, the at least one marker may be one marker 130 as shown in FIG. 1. In another embodiment, the at least one marker may include a first marker 131 and a second marker 132. The marker 130 in FIG. 1 and the first marker 131 and a second marker 132 in FIGS. 2 and 3 have described above, which will not be described again herein.

Figure 5:
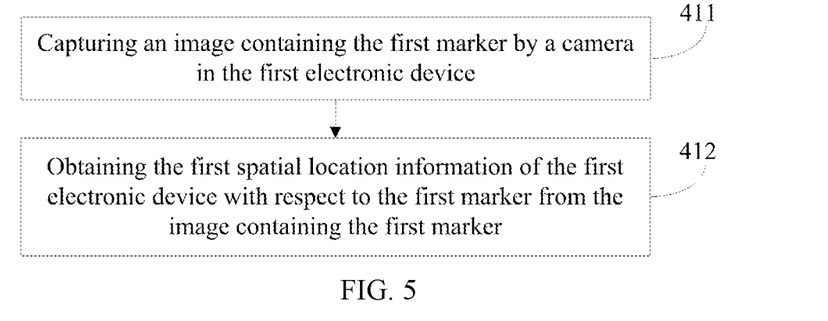
FIG. 5 is a flowchart of a method for displaying virtual content according to an embodiment of the present disclosure.

In one embodiment, the at least one marker may include a first marker 131 and a second marker 132, and the first electronic device 110 obtains the first spatial location information of the first electronic device 110 with respect to the at least one marker, including actions/operations in the following blocks as shown in FIG. 5.

At block 411, the first electronic device 110 captures an image containing the first marker 131 by the camera 115 in the first electronic device 110.

At block 412, the first electronic device 110 obtains the first spatial location information of the first electronic device 110 with respect to the first marker 131 from the image containing the first marker 131.

In one embodiment, the first spatial location information comprises an orientation parameter and a offset parameter for the first electronic device 110 with respect to the first marker 131. The first electronic device 110 obtains the first spatial location information of the first electronic device 110 with respect to the first marker 131 from the image con a ining the first marker 131. The first electronic device 110 firstly selects a preset number of feature points from the image containing the first marker 131 as target feature points. The first electronic device 110 then obtains pixel coordinate values of the target feature points in an image coordinate system of the image and physical coordinate values of the target feature points in a physical coordinate system of the first marker 131, respectively. The first electronic device 110 then derives a mapping parameter between the image coordinate system and the physical coordinate system based on the pixel coordinate values and the physical coordinate values of the target feature points. And the first electronic device 110 derive an orientation parameter and a offset parameter between a camera-coordinate system of the camera (e.g. camera 115 in FIG. 9) in the first electronic device 110 and the physical coordinate system based on the mapping parameter.

At block 420, the first electronic device 110 receives data of a first virtual object generated in a second electronic device 120 and a second spatial location information of the first virtual object with respect to the marker.

The first electronic device 110 receives data of the first virtual object and the second spatial location information from the second electronic device 120. It should be noted that before first electronic device 110 receives data of the first virtual object and the second spatial location information from the second electronic device 120, the first electronic device 110 has been established a connection with the second electronic device 120, which will be described below.

In one embodiment, the method further includes that the first electronic device 110 scans the marker 130 in FIG. 1 to establish a connection with the second electronic device 120. When the first electronic device 110 scans the marker 130 in FIG. 1, the first electronic device 110 may obtain information of the second electronic device 120, and then establish the connection with the second electronic device 120. In another embodiment, the method further includes that the first electronic device 110 scans the second marker 132 in FIG. 2 or 3 to establish a connection with the second electronic device 120. When the first electronic device 110 scans the second marker 132 in FIG. 2 or 3, the first electronic device 110 may obtain information of the second electronic device 120, and then establish the connection with the second electronic device 120.

In one embodiment, the first electronic device 110 receives the data of the first virtual object generated in the second electronic device 120 and the second spatial location information of the first virtual object with respect to the at least one marker, wherein the data of the first virtual object can include a model data of the first virtual object.

At block 430, the first electronic device 110 generates a second virtual object based on the data of the first virtual object, the first spatial location information, and the second spatial location information, to obtain a display content, wherein the second virtual object is same to the first virtual object in content while the second virtual object is different from the first virtual object with a different display angle.

Figure 6:
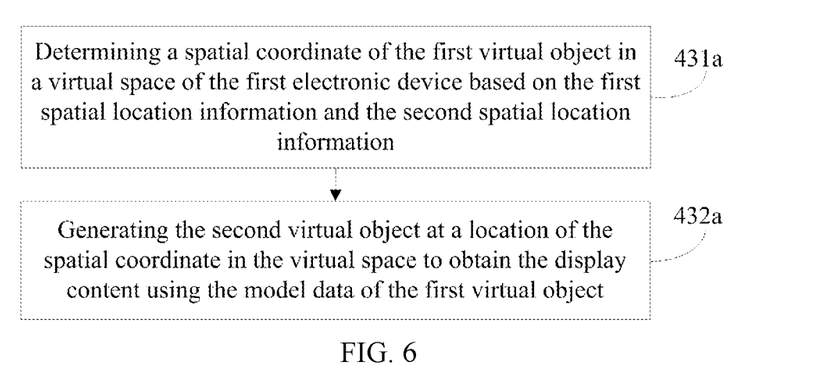
FIG. 6 is a flowchart of a method for displaying virtual content according to an embodiment of the present disclosure.

In one embodiment, as shown in FIG. 2, the first marker 131 is disposed at a same location as the second marker 132. In one embodiment, the first marker 131 is disposed on a surface of the second marker 132. The first marker 131 may be overlapped with the second marker 132 in the case the first marker 131 is disposed on a surface of the second marker 132. In this embodiment, the first electronic device 110 generates the second virtual object based on the data of the first virtual object, the first spatial location information, and the second spatial location information to obtain the display content, which includes actions/operation in the following blocks as shown in FIG. 6.

At block 431a, a spatial coordinate of the first virtual object in a virtual space of the first electronic device 110 is determined based on the first spatial location information and the second spatial location information.

At block 432a, the second virtual object at a location of the spatial coordinate in the virtual space is generated using the model data of the first virtual object, and the display content can be obtained according to the second virtual object.

Figure 7:
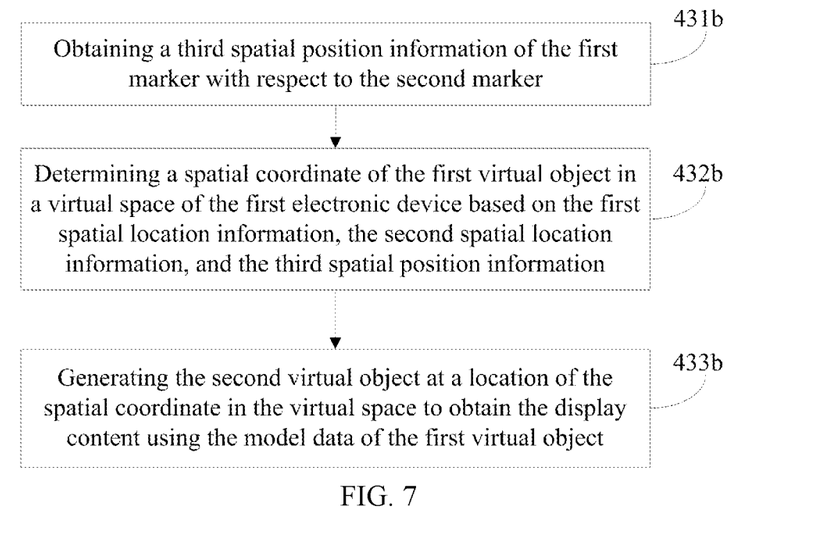
FIG. 7 is a flowchart of a method for displaying virtual content according to an embodiment of the present disclosure.

In another embodiment, as shown in FIG. 3, the first marker 131 is disposed at a location different from that of the second marker 132. In this embodiment, the first electronic device 110 generates the second virtual object based on the data of the first virtual object, the first spatial location information, and the second spatial location information to obtain the display content, which includes actions/operation in the following blocks as shown in FIG. 7.

At block 431b, a third spatial location information of the first marker 131 with respect to the second marker 132 is obtained.

When the first marker 131 and the second marker 132 are in different scenes, i.e. the first electronic device 110 and the second electronic device 120 are in different scenes, the third spatial location information means a relationship between a coordinate system of the first marker 131 and a coordinate system of the second marker 132. When the first marker 131 and the second marker 132 are in the same scene, i.e. the first electronic device 110 and the second electronic device 120 are in same scene, the third spatial location information means a relationship between the first marker 131 and the second marker 132 in the same coordinate system.

At block 432b, a spatial coordinate of the first virtual object in a virtual space of the first electronic device 110 is determined based on the first spatial location information, the second spatial location information, and the third spatial location information.

When the first marker 131 and the second marker 132 are disposed at different locations, the third spatial location information of the first marker 131 with respect to the second marker 132 may be pre-stored in the first electronic device 110. The first electronic device 110 converts the third spatial location information of the first marker 131 with respect to the second marker 132 into spatial location information of the first virtual object with respect to the first marker 131 according to the second spatial location information of the first virtual object with respect to the second marker 132. Then, according to the spatial location information of the first virtual object with respect to the first marker 131 and the first spatial location information, the location information of the first virtual object with respect to the first electronic device 110 in the real space is determined, and then converted to obtain the spatial coordinate of the first virtual object in the virtual space of the first electronic device 110.

At block 433b, the second virtual object at a location of the spatial coordinate in the virtual space is generated using the model data of the first virtual object, and the display content can be obtained according to the second virtual object.

In yet another embodiment, as shown in FIG. 1, at least one marker is just one marker 130. In this embodiment, the first electronic device 110 generates the second virtual object based on the data of the first virtual object, the first spatial location information, and the second spatial location information of the first virtual object with respect to the marker 130 to obtain the display content, which is same to that in FIG. 6 and will not described herein.

At block 440, the first electronic device 110 displays the display content.

After the display content is obtained, which means the second virtual object has been generated, the display content is displayed on the first electronic device 110.

In this embodiment, the user of the first device 110 can know more clearly the location of the virtual object in the real scene, and can view the virtual object from different perspectives, even though in a case where the location of the first device 110 is different from that of the second device 120 when the first device 110 and the second device are in a scene and the directions in which the respective users view are different.

In one embodiment, based on the method as shown in FIG. 4, the method further includes actions/operations in the following. The first electronic device obtains an image of a real scene when the first electronic device 110 and the second electronic device 120 are in the same real scene. And the display content then can be overlaid onto the image of the real scene to display, and then the overlaid content is displayed.

It should be appreciated that an order of the above actions/operations are performed is not limited to the numerical order. In one example, the above actions/operations can be performed before the block 430 and before the block 440.

In this embodiment, when the user of the first electronic device cannot view the real scene observed by the user of the second electronic device, and the real scene observed by the user of the second electronic device is not captured by the first electronic device, the real scene and the virtual object can be displayed on the first electronic device through the above actions/operations. Thus, the user of the first electronic device can know all the content viewed by the user of the second electronic device.

In one embodiment, based on the method as shown in FIG. 4, the method further includes actions/operations in the following. The first electronic device 110 receives a scene identifier sent by the second electronic device 120. The first electronic device 110 then obtains a virtual game scene corresponding to the scene identifier. A plurality of virtual game scenes are stored in the first electronic device 110, for example, the memory 112 in FIG. 9. The first electronic device 110 performs a fusion operation on an image of the virtual game scene and the display content to display the fused display content and the image of the virtual game scene. In specific, a location of the second virtual object on the virtual game scene is determined based on, for example, actual requirements, and the second virtual object is then laid onto the virtual game scene at the location.

It should be appreciated that an order of the above actions/operations are performed is not limited to the numerical order. In one example, the blocks above actions/operations can be performed before the block 430 and the block 440.

In this embodiment, the user of the first electronic device can play virtual games with the virtual content displayed on the second electronic device.

Figure 8:
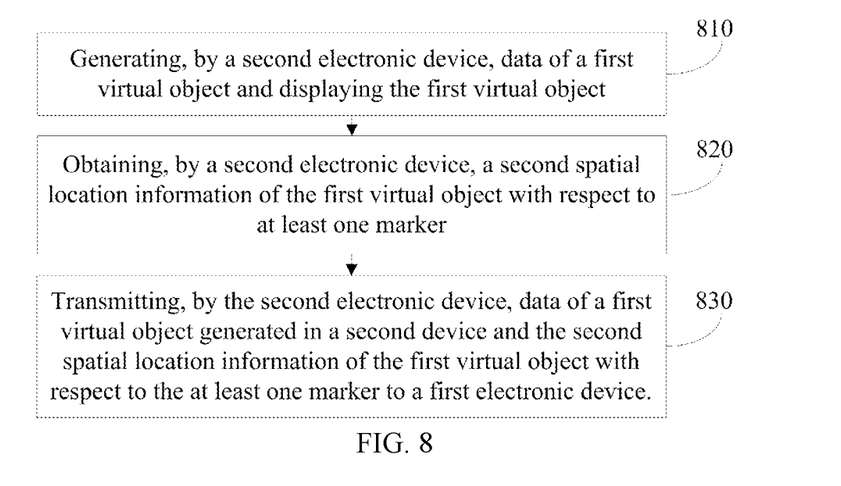
FIG. 8 is a flowchart of a method for displaying virtual content according to an embodiment of the present disclosure.

FIG. 8 is a flowchart of a method for displaying virtual content according to another embodiment of the present disclosure. The display method is performed by the second electronic device 120. As shown in FIG. 8, the display method includes actions/operations in the following blocks.

At block 810, the second electronic device 120 generates data of a first virtual object and displays the first virtual object.

The second electronic device 120 may be a head mounted display (HMD), which can provide an immersive virtual reality experience or augmented reality experience.

At block 820, the second electronic device 120 obtains a second spatial location information of the first virtual object with respect to at least one marker.

As mentioned above, in one embodiment, the at least one marker may be one marker 130 as shown in FIG. 1. In another embodiment, the at least one marker may include a first marker 131 and a second marker 132. The marker 130 in FIG. 1 and the first marker 131 and a second marker 132 in FIGS. 2 and 3 have described above, which will not be described again herein.

In one embodiment, as shown in FIG. 1, the at least one marker may be one marker 130, and the second electronic device 120 obtains the second spatial location information of the first virtual object with respect to the marker 130. In specific, in one embodiment, the second electronic device 120 obtains a fourth spatial location information of the second electronic device with respect to the marker 130. The second electronic device 120 obtains the fourth spatial location information in a similar way the first spatial location information mentioned above, which will not be described herein. The second electronic device 120 then obtains a spatial coordinate of the first virtual object with respect to the second electronic device. The second electronic device 120 then derives the second spatial location information based on the fourth spatial location information and the spatial coordinate of the first virtual object with respect to the second electronic device.

In another embodiment, as shown in FIGS. 2 and 3, the at least one marker may include a first marker 131 and a second marker 132, and the second electronic device 120 obtains the second spatial location information of the first virtual object with respect to the second marker 132. In specific, in one embodiment, the second electronic device 120 obtains a fourth spatial location information of the second electronic device with respect to the second marker 132. The second electronic device 120 obtains the fourth spatial location information in a similar way the first spatial location information mentioned above, which will not be described herein. The second electronic device 120 then obtains a spatial coordinate of the first virtual object with respect to the second electronic device 120. The second electronic device 120 then derives the second spatial location information based on the fourth spatial location information and the spatial coordinate of the first virtual object with respect to the second electronic device 120.

At block 830, the second electronic device 120 transmits data of a first virtual object generated in a second electronic device 120 and the second spatial location information of the second electronic device 120 with respect to the marker to a first electronic device 110.

In one embodiment, the second electronic device 120 transmits data of a first virtual object generated in a second electronic device 120 and the second spatial location information of the first virtual object with respect to the marker 130 in FIG. 1 to a first electronic device 110, wherein the data of the first virtual object can include a model data of the first virtual object. In another embodiment, the second electronic device 120 transmits data of a first virtual object generated in a second electronic device 120 and the second spatial location information of the first virtual object with respect to the second marker 132 in FIG. 2 or 3 to a first electronic device 110, wherein the data of the first virtual object can include a model data of the first virtual object.

It should be noted that the first electronic device 110 has been established a connection with the second electronic device 120, which has been described above.

Figure 9:
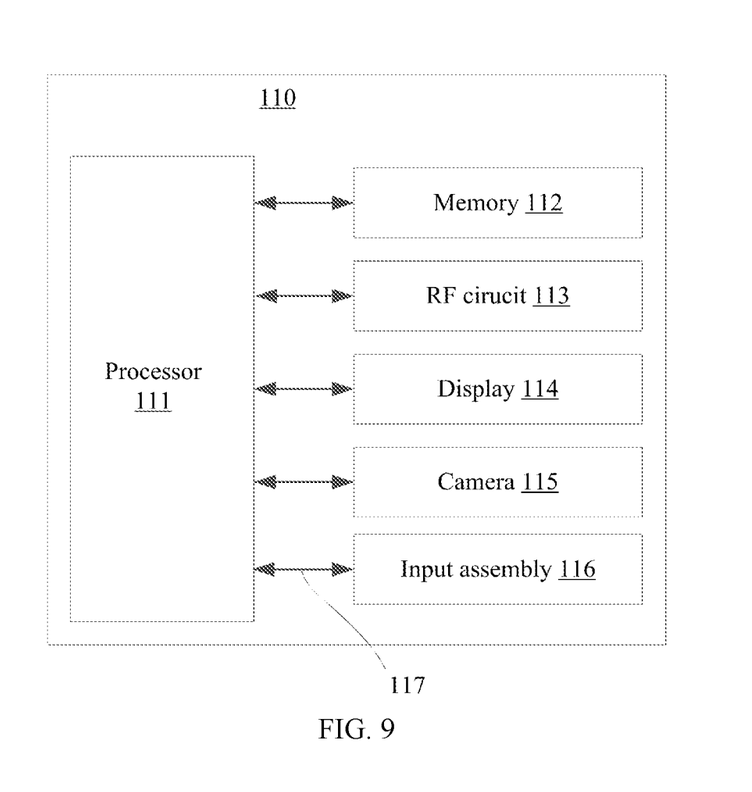
FIG. 9 is a structural diagram of a first electronic device of the system in FIGS. 1-3 according to an embodiment of the present disclosure.

FIG. 9 is a structural diagram of a first electronic device according to an embodiment in the present disclosure. As shown in FIG. 9, the first electronic device 110 may include one or more processors 111, a memory 112, an RF (Radio Frequency) circuit 113, a display 114, a camera 115, an input assembly 116, etc.

For the processors 111, other components such as a display screen 114 and a camera 115 belong to peripheral components, and the processor 111 is coupled to the peripheral components via a plurality of peripheral interfaces 117. The peripheral interface 117 can be implemented based on a standard, such as the Universal Asynchronous Receiver/Transmitter (UART), General Purpose Input Output (GPIO), Serial Peripheral Interface (SPI), Inter-Integrated Circuit (I2C), which is not limited herein. In some embodiments, peripheral interface 117 can include only a bus.

The memory 112 may be configured to store software programs and modules, and the processor 112 executes various function applications and data processing by running the software programs and the modules stored in the memory 112. The memory 112 can include a high speed random access memory, and may also include a non-volatile memory, such as one or more magnetic storage devices, flash memory, or other non-volatile solid state memory.

The RF circuit 113 is configured to receive and transmit electromagnetic waves, and realize mutual conversion between electromagnetic waves and electrical signals. Thus, it is communicated with a communication network or other devices. The RF circuit 113 can include various existing circuit components for performing these functions, such as an antenna, a radio frequency transceiver, a digital signal processor, an encryption/decryption chip, a Subscriber Identity Module (SIM) card, a memory, and the like. The RF circuit 113 can communicate with various networks such as the Internet, an intranet, a wireless network, or communicate with other devices over a wireless network. The wireless network described above may include a cellular telephone network, a wireless local area network, or a metropolitan area network. The above wireless network can use various communication standards, protocols and technologies, including but not limited to Global System for Mobile Communication (GSM), Enhanced Data GSM Environment (EDGE), and wideband code. Wideband code division multiple access (W-CDMA), Code division access (CDMA), time division multiple access (TDMA), wireless fidelity (Wi-Fi) (such as the Institute of Electrical and Electronics Engineers Standard IEEE 802.10A, IEEE 802.11b, IEEE 802.11g and/or IEEE 802.11n), Voice over internet protocol (VoIP), Worldwide Interoperability Microwave Access (Wi-Max), other protocols for mail, instant messaging and short messages, and any other suitable communication protocols, even those that are not currently being developed.

The display 114 is used to display information entered by the user, information provided to the user, and various graphical user interfaces of the first electronic device 110, which may be comprised of graphics, texts, icons, numbers, videos, and any combination thereof.

The camera 115 is used to photograph an image of a scene. The camera 115 may be an infrared camera or a color camera. The specific type of camera is not limited herein.

The input assembly 116 may include a touch screen arranged on the display 114, which can collect touch operations thereon or near (such as operations on the touch screen where the user uses the finger, any suitable object or attachment, such as a pen, on or near the touch screen). Of course, the input assembly 116 may also include an input keyboard.

It should be noted that the first electronic device 110 according to an embodiment of the present disclosure is not limited to the above components, and may include more or less components than the above components.

Figure 10:
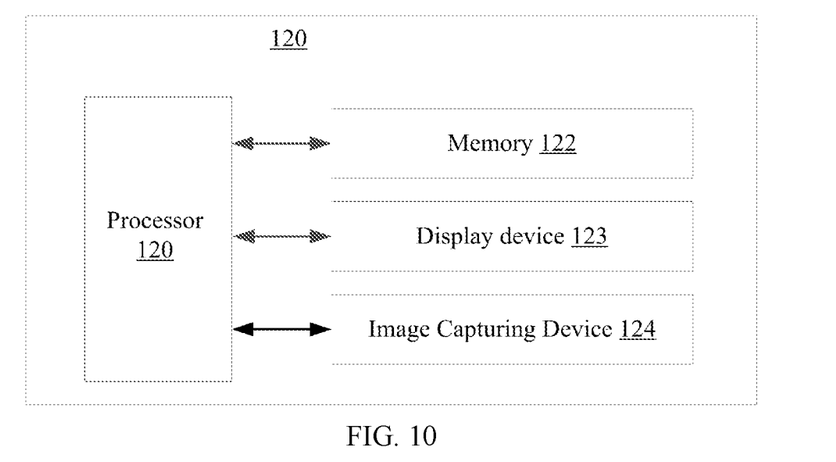
FIG. 10 is a structural diagram of a second electronic device of the system in FIGS. 1-3 according to an embodiment of the present disclosure.

FIG. 10 is a structural diagram of a second electronic device according to an embodiment in the present disclosure. The second electronic device 120 may be a head mounted display (HMD) and may include a processor 121, a memory 122, a display device 123, and an image capturing device 124. The display device 123, memory 122, and image capturing device 124 are coupled to processor 121.

The image capturing device 124 is configured to capture an image of the object to be photographed and send it to the processor 121. The image capturing device 124 may be an infrared camera, a color camera, or the like. The type of the image capturing device 124 is not limited herein.

The processor 121 can include any suitable type of general purpose or special purpose microprocessor, digital signal processor or microcontroller. The processor 121 can be configured to receive data and/or signals from various components of the system via, for example, a network. The processor 121 can also process data and/or signals to determine one or more operating conditions in the system. For example, the processor 121 generates images of the virtual world according to the image data stored in advance, and transmits the images to the display device 123 for display. For another example, the processor 121 may receive the transmitted image data of a smart terminal or a computer through a wired or wireless network, and generate an image of the virtual world to display according to the received image data. The processor 121 may also identify and position at least one marker according to the image captured by the image capturing device 124, determine the corresponding display content in the virtual world according to the positioning information, and sent the display content to the display device 123 for display. It can be understood that the processor 121 is not limited to being installed in the head mounted display device.

The memory 122 may be configured to store software programs and modules, and the processor 121 executes various function applications and data processing by running the software programs and the modules stored in the memory 122. The memory 122 can include a high speed random access memory and can also include non-volatile memory, such as one or more magnetic storage devices, flash memory, or other non-volatile solid state memory.

In another embodiment, the second electronic device 120 may only include a display device 123 and an image capturing device 124 in FIG. 10, the display device 123 and the image capturing device 124 are connected to an electronic device having a storage function and a processing function outside. It can be understood that the processing executed by the processor 121 in the above embodiments is executed by the processor of the electronic device, and the data stored in the memory in the above embodiments is stored by the memory of the electronic device. The electronic device may be a mobile terminal or a PC. In this embodiment, the second electronic device may be a mobile phone type or an external computer type.

The embodiments of the present disclosure have been described in detail above, and the principles and implementations of the present disclosure are described in the specific examples. The description of the above embodiments is only used to help understand the method of the present disclosure and its core ideas. For a person skilled in the art, there will have a change in the specific embodiments and the scope of present disclosure according to the idea of the present disclosure. In summary, the content of the present specification should not be construed as limiting the present disclosure.

What is claimed is:

1. A method for displaying virtual content, comprising:
obtaining, by a first electronic device, first spatial location information of the first electronic device with respect to a first marker;
receiving, by the first electronic device, model data of a first virtual object generated in a second electronic device and second spatial location information of the first virtual object with respect to a second marker, the second marker being disposed at a location different from that of the first marker;
obtaining third spatial location information for the first marker with respect to the second marker; determining a spatial coordinate of the first virtual object in a virtual space of the first electronic device based on the first spatial location information, the second spatial location information, and the third spatial location information;
generating, by the first electronic device, a second virtual object at a location of the spatial coordinate in the virtual space based on the model data of the first virtual object, to obtain a display content, wherein the second virtual object is same to the first virtual object in content while the second virtual object is different from the first virtual object with a different display angle; and
displaying, by the first electronic device, the display content.

2. The method of claim 1, wherein the first marker is configured to be identified and tracked by the first electronic device, and the second marker is configured to be identified and tracked by the second electronic device;
wherein obtaining the first spatial location information comprises:
capturing an image containing the first marker using a camera in the first electronic device; and
obtaining the first spatial location information of the first electronic device with respect to the first marker from the image containing the first marker.

3. The method of claim 2, further comprising:
obtaining fourth spatial location information of the second electronic device with respect to the second marker;
obtaining a spatial coordinate of the first virtual object with respect to the second electronic device; and
deriving the second spatial location information based on the fourth spatial location information and the spatial coordinate to of the first virtual object with respect to the second electronic device.

4. The method of claim 1, wherein the first marker comprises a pattern, and the pattern is configured to be identified and tracked by the first electronic device; the second marker comprises an infrared element, and the infrared element is configured to be identified and tracked by the second electronic device.

5. The method of claim 1, further comprising:
scanning, by the first electronic device, the second marker to establish a connection with the second electronic device.

6. The method of claim 1, wherein the first spatial location information comprises an orientation parameter and an offset parameter for the first electronic device with respect to the first marker; and
the obtaining the first spatial location information further comprises:
selecting a preset number of feature points from the image containing the first marker as target feature points;
obtaining pixel coordinate values of the target feature points in an image coordinate system of the image and physical coordinate values of the target feature points in a physical coordinate system of the first marker, respectively;
deriving a mapping parameter between the image coordinate system and the physical coordinate system based on the pixel coordinate values and the physical coordinate values of the target feature points; and
deriving the orientation parameter and the offset parameter between a camera-coordinate system of the camera in the first electronic device and the physical coordinate system based on the mapping parameter.

7. The method of claim 1, further comprising:
capturing an image of a real scene when the first electronic device and the second electronic device are in the same real scene;
overlaying the display content to the image of the real scene; and
displaying the overlaid content.

8. The method of claim 1, further comprising:
receiving a scene identifier sent by the second electronic device;
obtaining a virtual game scene corresponding to the scene identifier; and
performing a fusion operation on an image of the virtual game scene and the display content to display the fused display content and the image of the virtual game scene.

9. A method for displaying virtual content, comprising:
generating, by a second electronic device, data of a first virtual object and displaying the first virtual object;
obtaining, by the second electronic device, second spatial location information of the first virtual object with respect to a second marker, wherein the second marker is disposed at a location different from that of a first marker;
obtaining third spatial location information for the first marker with respect to the second marker; and
transmitting, by the second electronic device, the data of the first virtual object and the second spatial location information of the first virtual object with respect to the second marker to a first electronic device, wherein a second virtual object is generated in the first electronic device at a location of a spatial coordinate of the first virtual object in a virtual space of the first electronic device based on the data of the first virtual object, the location of the spatial coordinate of the first virtual object in the virtual space of the first electronic device is determined based on first spatial location information of the first electronic device with respect to the first marker, the second spatial location information, and the third spatial location information, to obtain a display content, the second virtual object is same to the first virtual object in content while the second virtual object is different from the first virtual object with a different display angle, and the display content is displayed on the first electronic device.

10. The method of claim 9, wherein the first marker is configured to be identified and tracked by the first electronic device, and the second marker is configured to be identified and tracked by the second electronic device;
wherein the obtaining the second spatial location information comprises:
obtaining fourth spatial location information of the second electronic device with respect to the second marker;
obtaining a spatial coordinate of the first virtual object with respect to the second electronic device; and
deriving the second spatial location information based on the fourth spatial location information and the spatial coordinate to of the first virtual object with respect to the second electronic device;
wherein the transmitting the data of the first virtual object and the second spatial location information comprises:
transmitting, by the second electronic device, model data of the first virtual object and the second spatial location information of the first virtual object with respect to the second marker.

11. The method of claim 9, wherein the first marker comprises a pattern, and the pattern is configured to be identified and tracked by the first electronic device; the second marker comprises an infrared element, and the infrared element is configured to be identified and tracked by the second electronic device.

12. The method of claim 9, further comprising:
scanning, by the first electronic device, the second marker to establish a connection with the second electronic device.

13. The method of claim 9, wherein the first spatial location information comprises an orientation parameter and an offset parameter for the first electronic device with respect to the first marker; the method further comprises:
selecting a preset number of feature points from the image containing the first marker as target feature points;
obtaining pixel coordinate values of the target feature points in an image coordinate system of the image and physical coordinate values of the target feature points in a physical coordinate system of the first marker, respectively;
deriving a mapping parameter between the image coordinate system and the physical coordinate system based on the pixel coordinate values and the physical coordinate values of the target feature points; and
deriving the orientation parameter and the offset parameter between a camera-coordinate system of the camera in the first electronic device and the physical coordinate system based on the mapping parameter.

14. A system for sharing virtual content, comprising a first electronic device, a second electronic device, a first marker, and a second marker, wherein the first marker is disposed at a location different from that of the second marker;
wherein the first electronic device comprises a processor and a non-transitory memory having instructions stored thereon, which when executed by the processor, cause the processor to perform a method comprises:
obtain a first spatial location information of the first electronic device with respect to the first marker;
receive data of a first virtual object generated in the second electronic device and second spatial location information of the first virtual object with respect to the second marker;
obtain third spatial location information for the first marker with respect to the second marker;
determine a spatial coordinate of the first virtual object in a virtual space of the first electronic device based on the first spatial location information, the second spatial location information, and the third spatial location information;
generate a second virtual object at a location of the spatial coordinate in the virtual space based on the data of the first virtual object, to obtain a display content, wherein the second virtual object is same to the first virtual object in content while the second virtual object is different from the first virtual object with a different display angle; and
display the display content.

15. The system of claim 14, wherein the first marker is configured to be identified and tracked by the first electronic device, and the second marker is configured to be identified and tracked by the second electronic device.

16. The system of claim 15, wherein the first marker comprises a pattern, and the pattern is configured to be identified and tracked by the first electronic device; the second marker comprises an infrared element, and the infrared element is configured to be identified and tracked by the second electronic device.

17. The system of claim 14, wherein the first marker and the second marker each has one or more feature points.

18. The system of claim 14, wherein the first marker is disposed in the field of view of the first electronic device, and the second marker is disposed in the field of view of the second electronic device.

19. The system of claim 14, wherein the second electronic device is a head mounted display.

20. The system of claim 14, wherein the first marker comprises a pattern, and the pattern is configured to be identified and tracked by the first electronic device; the second marker comprises an infrared element, and the infrared element is configured to be identified and tracked by the second electronic device.

* * * * *